(12) United States Patent
Warashina et al.

(10) Patent No.: US 7,174,639 B2
(45) Date of Patent: *Feb. 13, 2007

(54) BUSH CUTTING MACHINE

(75) Inventors: Makoto Warashina, Wako (JP); Hiroaki Uchitani, Wako (JP); Hideshi Sasaki, Wako (JP)

(73) Assignee: Honda Giken Kogyo Kabushiki Kaisha (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/121,251

(22) Filed: May 3, 2005

(65) Prior Publication Data
US 2005/0198835 A1   Sep. 15, 2005

Related U.S. Application Data

(63) Continuation of application No. 10/055,285, filed on Jan. 23, 2002, now Pat. No. 6,901,666.

(30) Foreign Application Priority Data

Feb. 7, 2001   (JP)   ............................. 2001-031493

(51) Int. Cl.
*B26B 7/00* (2006.01)
*A01D 34/68* (2006.01)

(52) U.S. Cl. ........................ 30/276; 30/DIG. 5; 30/340; 30/347; 30/277.4; 30/264; 56/12.7; 74/551.9

(58) Field of Classification Search .................. 30/226, 30/90, 216, 12.7, 296, 11.3, 276, 296.1, 340, 30/236, 247, 346.5, 476, 477, 144, 166.3, 30/388, 389, 501, 517, 520, 180, 205, 263, 30/347, 296 R, DIG. 5, 269.1; 56/12.7, 56/11.3, 12.5, 11.1, 11.2, 295; 294/172; 74/551.9, 489, 543, 551.5, 551, 547, 557; 172/41, 13, 14, 96, 94, 110
See application file for complete search history.

(56) References Cited

U.S. PATENT DOCUMENTS

| 2,637,565 | A | * | 5/1953 | Lantry ...................... 280/14.28 |
| 3,344,684 | A | * | 10/1967 | Steere, Jr. et al. ......... 74/551.9 |
| 4,282,652 | A | * | 8/1981 | Ballas, Sr. .................... 30/276 |
| 4,342,369 | A | * | 8/1982 | Ransom ...................... 180/19.3 |
| 6,056,668 | A | * | 5/2000 | Nagashima .................. 477/207 |
| 6,085,503 | A | * | 7/2000 | Hutchinson ................. 56/12.7 |
| 6,176,016 | B1 | * | 1/2001 | Higashi et al. ............... 30/276 |
| 6,415,588 | B1 | * | 7/2002 | Kao ........................... 56/16.7 |

* cited by examiner

*Primary Examiner*—Boyer D. Ashley
*Assistant Examiner*—Ghassem Alie
(74) *Attorney, Agent, or Firm*—Adams & Wilks

(57) ABSTRACT

A vegetation cutting machine has a tubular operation rod, a motor mounted to an end of the operation rod, a drive shaft extending through the operation rod and driven by the motor, a cutting tool provided at a distal end of the operation rod to undergo rotation with the drive shaft, a handle mounted on the operation rod, and a pair of handgrips provided on distal ends of the handle. Each of a pair of fastener members traverses the handle and a respective one of the handgrips for fixedly mounting the respective handgrip to the handle at a point located substantially at a center of gravity of a sum of a mass of the respective handgrip and a mass of a portion of the handle extending between the fixing point and a respective one of the distal ends of the handle, such that the fastener members of the respective handgrips are located at positions of the handle at which vibrations transmitted to the handle from the motor through the operation rod are minimized.

2 Claims, 5 Drawing Sheets

FIG.5A
FIG.5B
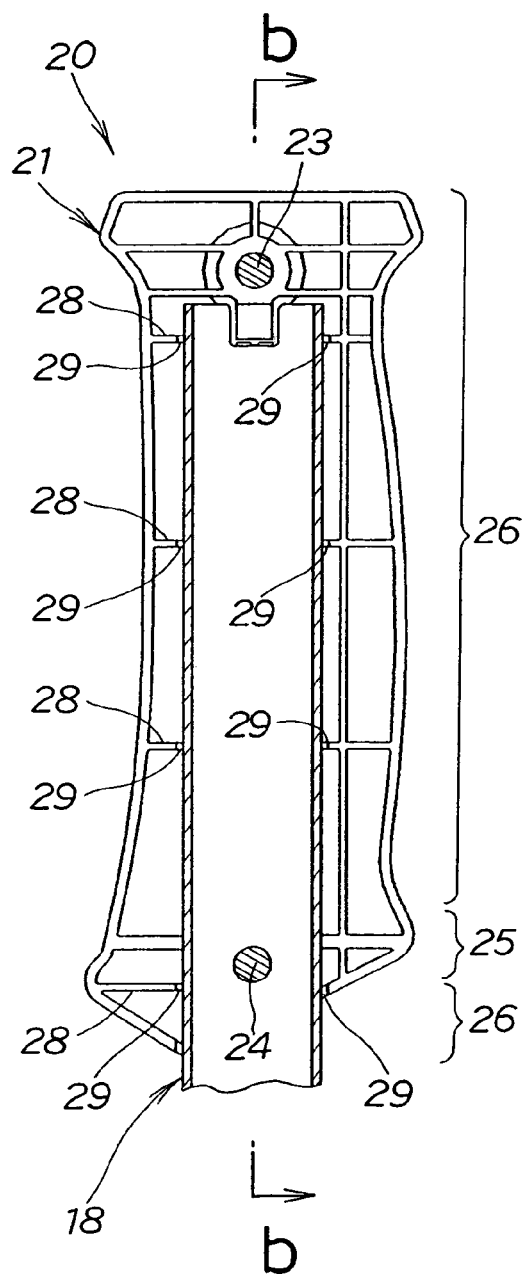
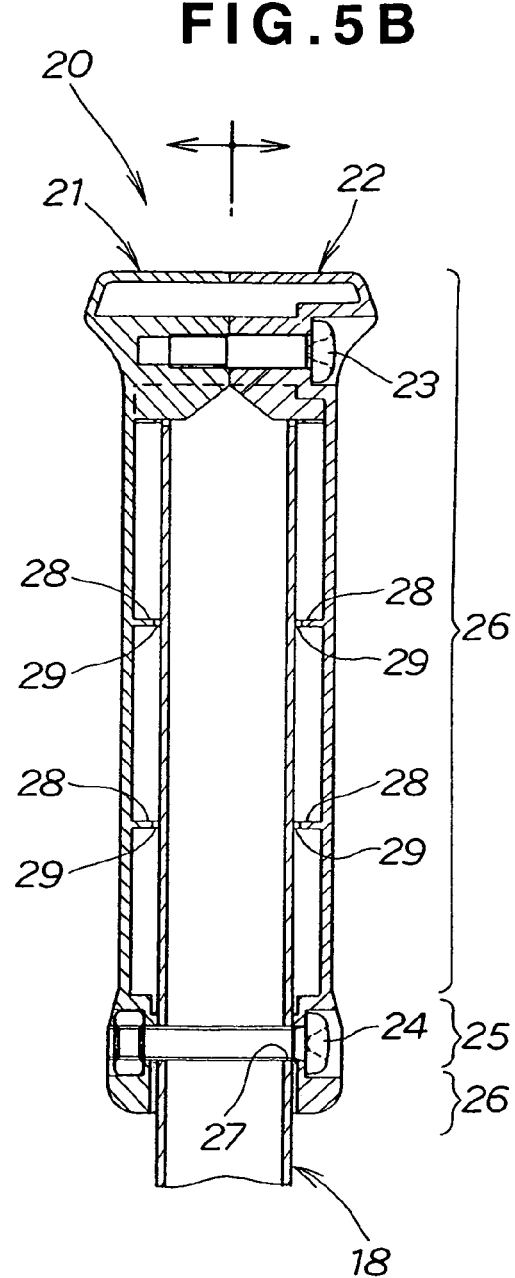

BUSH CUTTING MACHINE

CROSS-REFERENCE TO RELATED APPLICATIONS

This application is a continuation application of U.S. patent application Ser. No. 10/055,285 filed Jan. 23, 2002 now U.S. Pat. No. 6,901,666 and claiming a priority date of Feb. 7, 2001.

FIELD OF THE INVENTION

This invention relates generally to a bush cutting machine and, more particularly, to an improved grip mounting structure for mounting a grip to a handle of the bush cutting machine.

BACKGROUND OF THE INVENTION

Since weeds that grow in farms tend to become a nest swarming with vermin of all types, there is a need for cutting those weeds several times a year. Since weed cutting is laborious, various machines have been proposed and put into practical use. Among these machines, bush cutting machines have become popular because they are small in size and easy to manipulate. An example of such bush cutting machines is disclosed in, for example, Japanese Patent Laid-Open Publication No. SHO-61-231039, entitled "VIBRATION ABSORBING GRIP", and Japanese Utility Model Laid-Open Publication No. SHO-51-144446, entitled "VIBRATION-PROOFING STRUCTURE FOR HANDLE OF BUSH CUTTING MACHINE".

In the bush cutting machine of SHO-61-231039, a drive shaft housed in a pipe-shaped operation rod is rotated by an engine provided at a proximal end of the operation rod to rotate a disc-shaped cutter provided at a distal end of the operation rod to thereby cut weeds. In use, the bush cutting machine is suspended from a shoulder of an operator who swings the operation rod in fore and aft directions and in right and left directions while gripping left and right grips of a U-shaped handle located midway of the operation rod, to cut the weeds. The left and right grips are made of resilient members for absorbing vibrations.

The bush cutting machine of SHO-51-144446 includes grips provided at right and left portions of a U-shaped handle mounted to an operation handle. The grips are arranged such that elongate core rods, composed of bolts, protrude from right and left distal ends of the handle, and tubular grips are slidably mounted to the respective core rods to allow vibration-proof members such as springs or sponges to be interposed between the core rods and the grips. The vibration-proof members are provided for absorbing vibrations to be imparted to the handle in a longitudinal direction thereof.

In recent years, there is an increasing demand for farm labor environment to be further improved. Even as for bush cutting machines, a demand has grown for more efficiently eliminating vibrations to be transmitted from the handle to the grip so as to reduce farm workers' labor.

However, the bush cutting machine of SHO-61-231039 has a limit in the reduction of vibrations because it relies solely on the elasticity of the right and left elastic grips which absorb vibrations to only an extent.

In the bush cutting machine of SHO-51-14446, the vibration-proof members are provided to absorb vibrations imparted longitudinally of the handle. This arrangement is assumed to work in reducing vibrations applied in such a direction to some extent but not vibrations applied in other directions. Further, the grips are complicated in structure.

SUMMARY OF THE INVENTION

It is therefore an object of the present invention to provide a bush cutting machine which has a simple arrangement for reducing vibrations to be transmitted from a handle to a grip of the bush cutting machine with increased efficiency.

According to an aspect of the present invention, there is provided a bush cutting machine which comprises: a pipe-shaped operation rod; a prime mover mounted to a proximal end of the operation rod; a drive shaft extending through the operation rod and driven by the prime mover; a cutter provided at a distal end of the operation rod and rotated by rotation of the drive shaft; a bar-shaped handle fixed to an arbitrary position of the operation rod between the prime mover and the cutter; and right and left grips mounted to distal ends of the handle, wherein each grip is mounted at a center of gravity of a sum of a mass of a handle portion between a fixing point and a respective one of the distal ends of the handle and a mass of the grip, or at a position proximate to the center of gravity.

A phenomenon is known in which when a bar-shaped member to which vibrations are transferred is provided with a knot or a flange, amplitudes of the vibrations become small at those portions where the knot or flange is provided. The present inventors have found that such a phenomenon also takes place at a center of gravity of the bar-shaped member, or at an area proximate thereto. Thus, the grips are provided at the center of gravity of the sum of masses described above or at the area proximate thereto so that the amplitudes of vibrations transferred from the handle to the grips become small. Vibrations transferred from the bar-shaped handle to the grips can thus be diminished with an increased efficiency without requiring arrangements that make the machine complex in structure.

Desirably, the grips have escape portions formed in areas except for mount portions to be fixed to the handle for preventing other portions from being brought into contact with the handle. Since the grips are kept out of contact with the handle at the areas remote from the mount portions, there is no chance for vibrations of large amplitude to be transferred from the handle to the grips. As a consequence, the grips can be maintained in a condition wherein the least vibrations are transferred from the handle.

BRIEF DESCRIPTION OF THE DRAWINGS

A preferred embodiment of the present invention will be described in detail below, by way of example only, with reference to the accompanying drawings, in which:

FIG. 5A is a cross-sectional view illustrating a left grip shown in FIG. 4; and

FIG. 5B is a cross-sectional view taken along line b—b of FIG. 5A.

DETAILED DESCRIPTION OF THE PREFERRED EMBODIMENT

Figure 1:
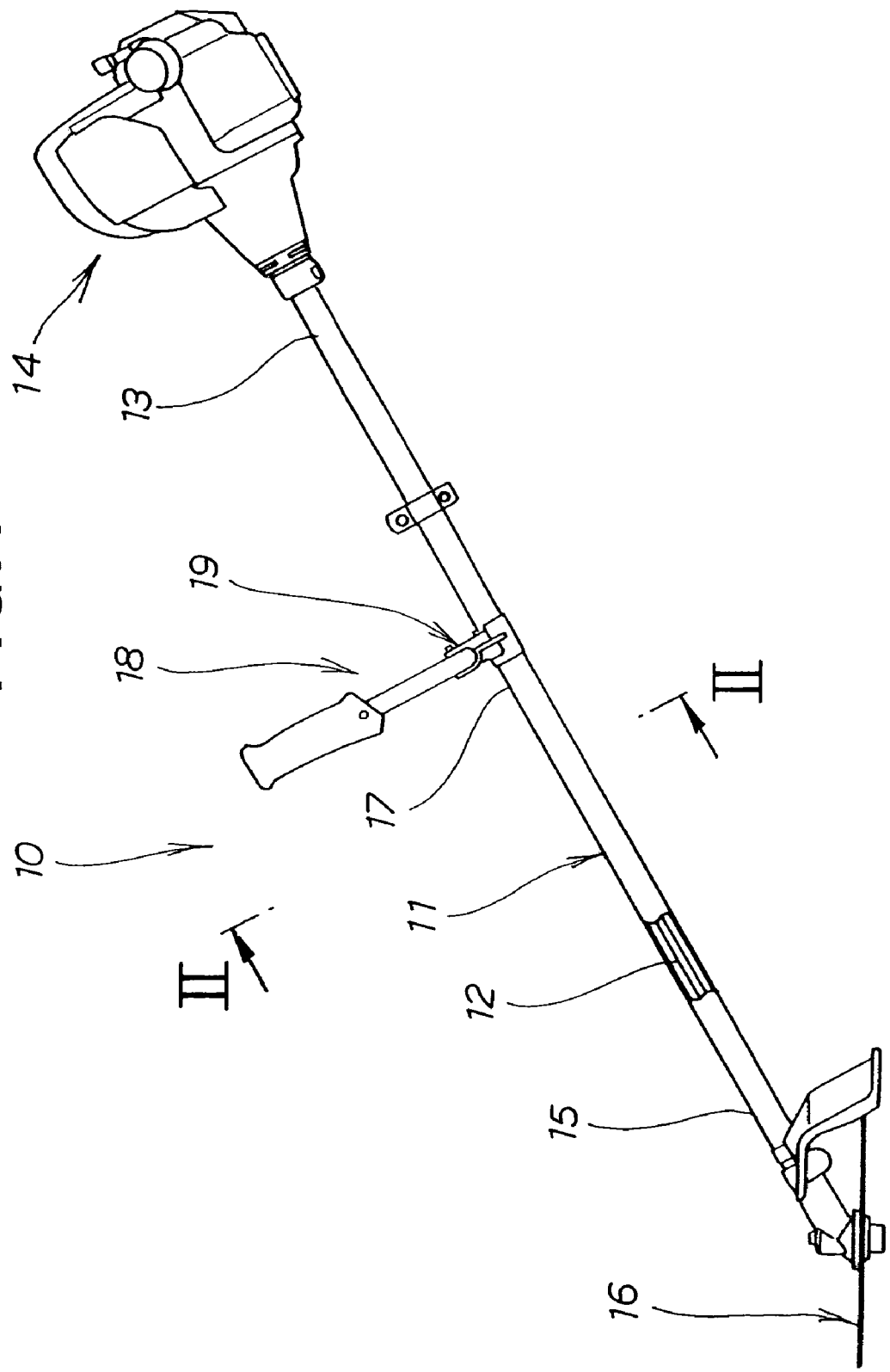
FIG. 1 is a side elevational view illustrating a bush cutting machine according to the present invention.
Figure 2:
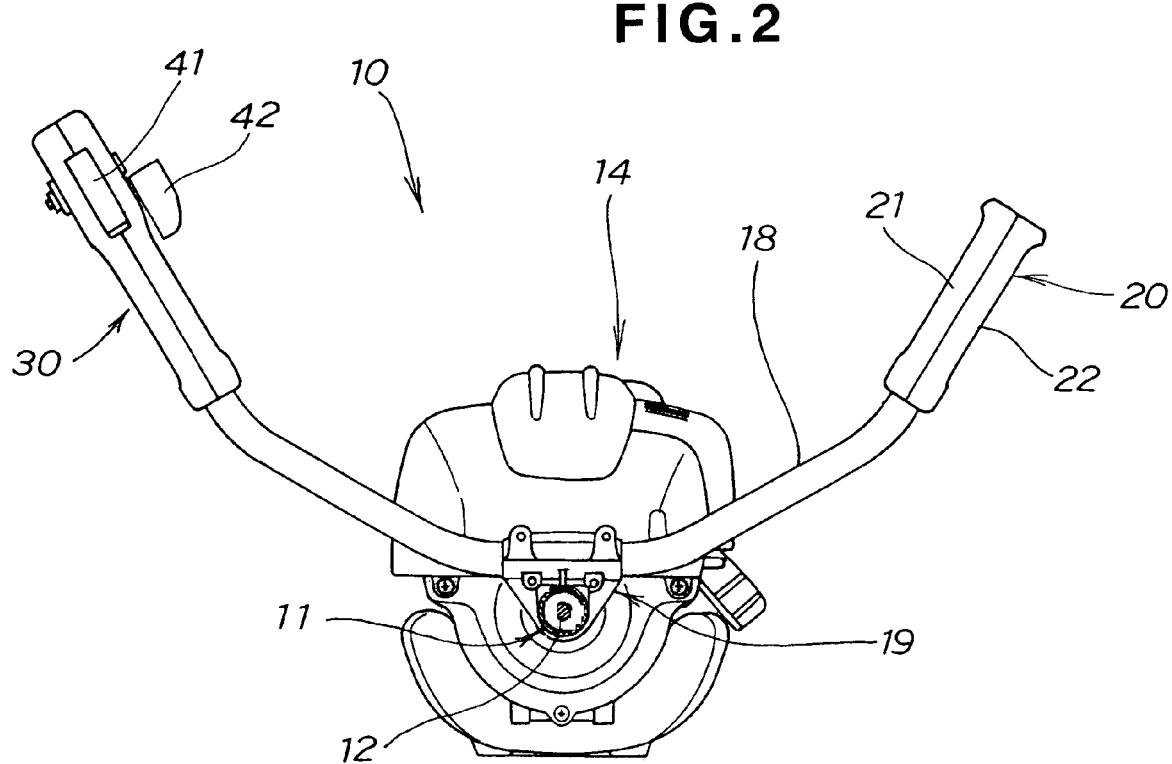
FIG. 2 is a cross-sectional view taken along line II—II of FIG. 1.

As shown in FIG. 1, a bush cutting machine 10 according to the present invention includes a pipe-shaped operation rod 11, a prime mover 14 mounted to a base portion 13 of the operation rod 11, and a disc-shaped cutter 16 carried at a distal end 15 of the operation rod 11. A drive shaft 12 is internally incorporated in the operation rod 11 and is rotated by the drive power of the prime mover 14. Rotation of the drive shaft 12 causes the cutter 16 to rotate. A handle 18 for operating the bush cutting machine 10 is fixedly secured to the operation rod 11 at an intermediate portion (substantially central area in an example shown in the drawing) thereof between the prime mover 14 and the cutter 16 via a handle holder 19. The handle 18 has a U-shape configuration as shown in FIG. 2. The prime mover 14 includes an engine or an electric motor.

FIG. 2 shows a condition wherein the handle 18 is fixedly secured to the operation rod 11 via the handle holder 19.

The handle 18 is mounted to the operation rod 11 via the handle holder 19. The handle 18 is comprised of one piece of pipe or a bar member, whose left and right portions have grips 20, 30. The right grip 30 serves as an operating portion having a throttle lever 41, for controlling the prime mover 14, and a lock lever 42.

Figure 3:
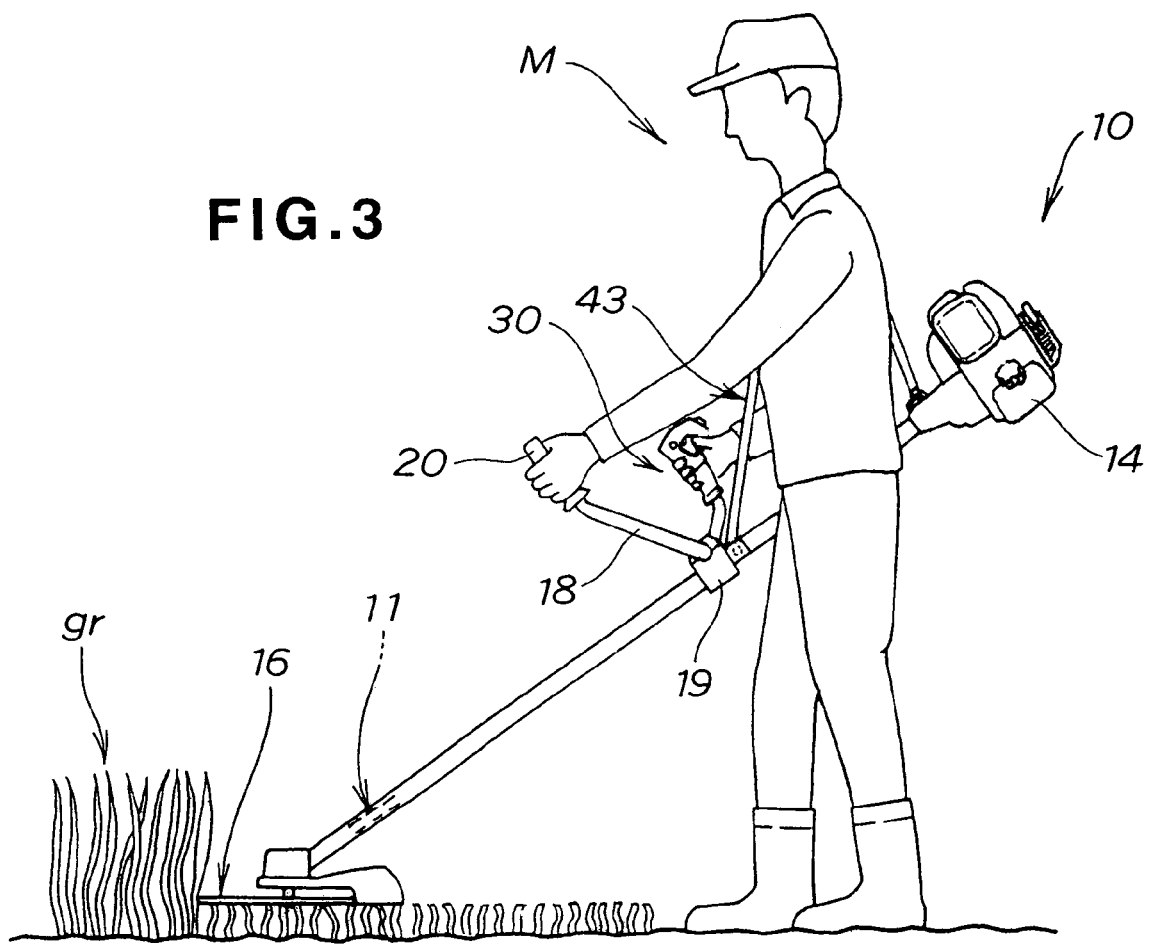
FIG. 3 is a schematic view illustrating the bush cutting machine in use.

As shown in FIG. 3, the bush cutting machine 10 is suspended from a shoulder of an operator M via a shoulder strap 43 mounted to the operation rod 11. By rotating the cutter 16 by the prime mover 14 while gripping the left and right grips 20, 30 and swinging the operation rod 11 in fore and aft directions, weeds and grass are cut.

Vibrations produced during operation of the prime mover 14, are transferred to the operator M via the handle 18 and through the grips 20, 30. In particular, since the bush cutting machine 10 compels the prime mover 14 to rotate the cutter 16 via the drive shaft 12, vibrations to be transferred to the grips 20, 30 from the operation rod 11 via the handle 18 generally have a large amplitude in a rotational direction. As a consequence, it is preferred for vibrations in such a direction to be diminished to a value as small as possible. The present invention aims to reduce such vibrations to a minimum. A technology to attain such aim is described in detail below.

Figure 4:
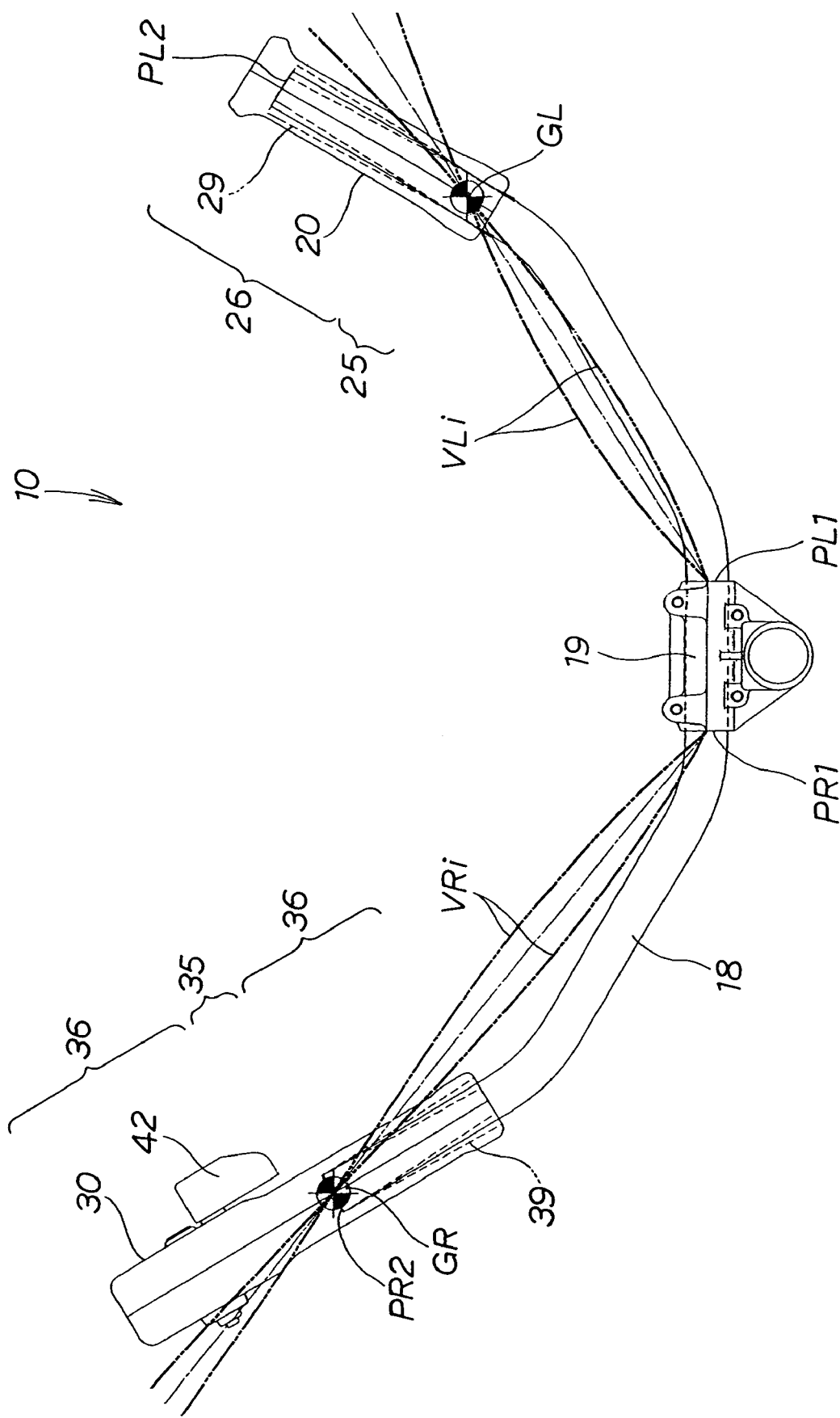
FIG. 4 is a front view illustrating a handle and grips employed in the bush cutting machine.

Referring now to FIG. 4, mount positions of the left and right grips 20, 30 are described.

First, a left half of the handle 18 is discussed. A portion of the handle 18 extending from a fixing point PL1 on a left side of the handle holder 19 has a mass of mL1 (hereinafter referred to as "left handle mass mL1"), while the left grip 20 has a mass of mL2 (hereinafter referred to as "left grip mass mL2"). Thus, the left side has a mass of mL3 which is a sum of the left handle mass mL1 and the left grip mass mL2 (mL3=mL1+mL2). The sum mL3 of the left side has a center of gravity as at GL. The present invention is characterized in that the left grip 20 is mounted to the handle 18 by a screw 24 at a mounting portion 25 (see FIGS. 5A and 5B) substantially at its center of gravity GL corresponding to the mass mL3 which is a sum of the left handle mass mL1 and the left grip mass mL2, or at a position proximate thereto.

Now, a right half of the handle 18 is discussed. A portion of the handle 18 extending from a fixing point PR1 on a right side of the handle holder 19 has a mass of mR1 (hereinafter referred to as "right handle mass mR1"), while the right grip 39 has a mass of mR2 (hereinafter referred to as "right grip mass mR2"). Thus, the right side has a mass of mR3 which is a sum of the right handle mass mR1 and the right grip mass mR2 (mR3=mR1+mR2). The sum mR3 of the right side has a center of gravity as at GR. The present invention is characterized in that the right grip 30 is mounted to the handle 18 by a screw 24 at a mounting portion 25 substantially at its center of gravity GR corresponding to the right side mass mR3 which is a sum of the right handle mass mR1 and the right grip mass mR2, or at a position proximate thereto.

It should be noted that the right grip mass mR2 is, by design, greater than left grip mass mL2. This is due to the fact that the right grip 30 has the operating members such as the lock lever 42 and is relatively large in size and is heavy in weight. As a result, the center of gravity GR of the right mass sum mR3 lies at a point spaced from the handle holder 19 apart in a larger distance from the center of gravity GL of the left mass sum mL3.

Since the central portion of the handle 18 is fixed to the operation rod 11 shown in FIG. 2, the structure wherein the left grip 20 is mounted to the left distal end of the handle 18, and the structure wherein the right grip 30 is mounted to the right distal end of the handle 18 can be considered as cantilever booms, respectively. The present invention contemplates that the grips 20, 30 are mounted to the centers of gravity GL, GR or to areas proximate to the centers of gravity GL, GR.

Generally, a phenomenon is known in which the presence of a knot or a flange formed in a bar-shaped member through which vibrations are transferred makes the amplitudes of the vibrations at those portions small. The present inventors have found that such a phenomenon also takes place in the bar-shaped member at its center of gravity, or at an area proximate thereto. Curves VLi, Vri are schematic illustrations of vibratory waveforms of the handle 18.

In the inventive arrangement, since the grips 20, 30 are provided at the centers of gravity GL, GR or at the positions proximate to the centers GL, GR of gravity, vibrations transmitted from the handle 18 to the grips 20, 30 become extremely small in amplitude. With such an expedient, it is possible for vibrations, which transmit from the handle 18 to the grips 20, 30, to be further reduced. Further, since the structure for reducing vibrations to be transferred from the handle 18 to the grips 20, 30 can be achieved merely by mounting the grips 20, 30 to the centers of gravity GL, GR or to the positions proximate to those centers of gravity GL, GR, a significantly simplified structure can be obtained. There is no need for providing particular component parts for reducing vibrations, resulting in the reduction in weight of the bush cutting machine 10 and in the reduction of manufacturing cost.

Furthermore, the present invention is also featured in escape portions 29, 39 formed in respective areas except for mount portions 25, 35 mounted to the handle 18 for precluding other portions 26, 36 from being brought into contact with the handle 18. Thus, the grips 20, 30 remain non-contact with the handle 18 at the respective areas displaced apart from the mount portions 25, 35. For this reason, there is no chance for vibrations of large amplitude to be transferred from the handle 18 to the grips 20, 30. Accordingly, it is possible for the bar-shaped handle 18 to be maintained in a low level of vibrations transferred from the bar-shaped handle 18 to the grips 20, 30.

Next, the escape portions 29, 39 are described below with reference to FIGS. 5A and 5B.

As shown in FIG. 5A, the grip 20 includes two grip halves between which the handle 18 is held, with a first grip half 21 and a second grip half 22 mating with one another and fixed to the handle 18 by upper and lower fastener members in the form of screws 23, 24. The left grip 20 has a plurality of escape portions 29, formed in an area except for the mount portions 25, which is mounted to the handle 18 with the lower screw 24 at the center GL (see FIG. 4) of gravity of the sum mL3 of left mass, to preclude the other remaining portion 26 from being brought into contact with the handle 18.

More particularly, the mount portion 25 of the handle 18 is composed of an inner circumferential periphery formed by the first and second grip halves 21, 22 at areas between which an outer circumferential periphery of the handle 18 is caught. The left grip 20 is mounted to the handle 18 by inserting the lower screw 24 through a through-bore 27 formed in the handle 18 and compelling the lower screw 24 to tighten the handle 18 and the first and second grip halves 21, 22 with respect to one another.

On the other hand, the first and second grip halves 21, 22 have a plurality of annular ribs 28 which are integrally formed in a longitudinally spaced relationship with a given distance and which face to the outer circumferential periphery of the handle 18. Formed between the outer circumferential periphery of the handle 18 and respective inner distal ends of the annular ribs 28 are gaps which form the escape portions 29, respectively. With such a structure, the left grip 20 remains non-contact with the handle 18 at the other remaining portion 26 except for the mount portion 25 of the handle 18.

The right grip 30 shown in FIG. 4 has the same structure as the left grip 20 shown in FIGS. 5A and 5B and, therefore, a description of the same is herein omitted.

According to the preferred embodiment discussed above, further, the handle 18 may have a bar-shaped configuration and may be designed in any arbitrary shape, dimension and material and may have any fixing structure relative to the operation rod. Also, the grips 20, 30 may be designed in any arbitrary shape, dimension and material and in a fixing structure relative to the handle 18.

The present disclosure relates to the subject matter of Japanese Patent Application No. 2001-031493, filed Feb. 7, 2001, the disclosure of which is expressly incorporated herein by reference in its entirety.

What is claimed is:

1. A vegetation cutting machine comprising: a pipe-shaped operation rod; a motor mounted to a proximal end of the operation rod; a drive shaft extending through the operation rod and driven by the motor; a cutting tool provided at a distal end of the operation rod to undergo rotation with the drive shaft; a handle comprised of a bar mounted at a fixing point to the operation rod between the motor and the cutting tool; right and left handgrips provided on distal ends of the bar; and a pair of fastener members each traversing the bar and a respective one of the handgrips for fixedly mounting the respective handgrip to the bar at a point located substantially at a center of gravity of a sum of a mass of the respective handgrip and a mass of a portion of the bar extending between the fixing point and a respective one of the distal ends of the bar, such that the fastener members of the respective handgrips are located at positions of the bar at which vibrations transmitted to the bar from the motor through the operation rod are minimized; wherein each of the handgrips comprises an elongated hollow body composed of two grip halves connected together, a respective one of the distal end portions of the bar being held between the grip halves, the grip halves having inner peripheral surface portions forming a mounting portion of the handgrip that is held in direct contact with an outer circumferential surface of the bar substantially at the center of gravity; and wherein each handgrip has escape portions that are not in contact with the bar, the escape portions having a plurality of annular ribs projecting from inner peripheral surfaces of the grip halves and spaced from one another in a longitudinal direction of the elongated body of the handgrip, the annular ribs having distal ends spaced from the outer circumferential surface of the bar by gaps forming the escape portions of the handgrip.

2. A vegetation cutting machine comprising: an elongated rod; a motor mounted to a proximal end of the elongated rod; a drive shaft extending through the elongated rod and driven by the motor; a cutting tool provided at a distal end of the elongated rod to undergo rotation with the drive shaft; a handle assembly having a bar fixedly mounted to the elongated rod at a fixing point between the motor and the cutting tool; right and left handgrips provided on distal end portions of the bar; and a pair of fastener members each traversing the bar and a respective one of the handgrips for fixedly mounting the respective handgrip to the bar at a point located substantially at a center of gravity of a sum of a mass of the respective handgrip and a mass of a portion of the bar extending between the fixing point and the distal end of the respective bar, such that the fastener members of the respective handgrips are located at positions of the bar at which vibrations transmitted to the bar from the motor through the operation rod are minimized, and a plurality of escape portions formed in portions of each handgrip so as to keep the portions of the handgrip out of contact with the bar to suppress transmission of vibration from the bar to the handgrip; wherein each of the handgrips comprises an elongated hollow body composed of two grip halves connected together, a respective one of the distal end portions of the bar being held between the grip halves, the grip halves having inner peripheral surface portions forming a mounting portion of the handgrip that is held in direct contact with an outer circumferential surface of the bar substantially at the center of gravity; and wherein the portions of the handgrip have a plurality of annular ribs projecting from inner peripheral surfaces of the grip halves and spaced from one another in a longitudinal direction of the elongated body of the handgrip, the annular ribs having distal ends spaced from the outer circumferential surface of the bar by gaps forming the escape portions of the handgrip.

* * * * *